(12) United States Patent
Skarda (10) Patent No.: US 9,767,660 B1
(45) Date of Patent: Sep. 19, 2017

(54) ADJUSTABLE ENTRY SECURITY SENSOR

(71) Applicant: Nortek Security & Control LLC, Carlsbad, CA (US)

(72) Inventor: Brian Vencil Skarda, South Jordan, UT (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/388,859

(22) Filed: Dec. 22, 2016

(51) Int. Cl.
*G08B 13/08* (2006.01)
*G01D 5/14* (2006.01)

(52) U.S. Cl.
CPC .............. *G08B 13/08* (2013.01); *G01D 5/14* (2013.01)

(58) Field of Classification Search
CPC ...... G08B 13/08; G08B 13/149; G08B 13/24; G01D 5/14; G01D 5/142; G01D 5/145; G01B 5/147
See application file for complete search history.

(56) References Cited

U.S. PATENT DOCUMENTS

2016/0189506 A1* 6/2016 Peterson ............... G08B 13/24
340/551

* cited by examiner

*Primary Examiner* — Curtis Odom
(74) *Attorney, Agent, or Firm* — Schwegman Lundberg & Woessner, P.A.

(57) ABSTRACT

An adjustable security sensor device is described. The device comprises a magnetic field sensor, a user input element, and a processor. The magnetic field sensor measures and samples magnetic fields from a magnet external to the device. The magnetic field sensor generates a first range of magnetic fields measurements sampled based on a first position of the magnet relative to the magnetic field sensor. The user input element identifies a second range of magnetic fields measurements based on a second position of the magnet relative to the magnetic field sensor. The device generates a sampling of magnetic fields measurements using the magnetic field sensor, compares the sampling of magnetic fields measurements with the first range of magnetic fields measurements and the second range of magnetic fields measurements, and identifies a position of the device relative to the magnet based on the comparison.

20 Claims, 6 Drawing Sheets

ADJUSTABLE ENTRY SECURITY SENSOR

TECHNICAL FIELD

This application relates generally to a user-adjustable sensor device, and, in an example embodiment, to an entry security sensor that detects various user-defined positions.

BACKGROUND

Current door and window sensors operate in a binary mode: open or closed indicators. In particular, door and window sensors that rely on a magnetic switch can be defeated by securing a magnet in a correct position to falsely hold a reed switch in a closed position. These sensors have very little capability in the adjustment of the magnet placement. The dynamic range between the magnet and the sensor is principally for compensation of the gap between the magnet and the sensor due to the door/window construction and is restricted to fairly narrow separations.

The typical security sensor uses a reed switch that is placed in very close proximity (usually less than 1") to a magnet to indicate only an open or closed state. So, if a homeowner wants to sleep with his or her window cracked ajar, the homeowner would need to install two magnets (one for the open position, and one for the closed position) and very carefully open the window to a specific position to avoid triggering an open state with an alarm system.

BRIEF DESCRIPTION OF THE DRAWINGS

The present embodiments are illustrated by way of example, and not by way of limitation, in the figures of the accompanying drawings.

DETAILED DESCRIPTION

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The present disclosure describes a door or window sensor that incorporates a user-adjustable feature to allow the sensor to function at various door/window positions. For example, operating the sensor at various positions (instead of the binary open or closed position) would allow a security system to monitor a partially open door or window without triggering an alarm since the window is already open at a defined user-selected position. However, any variation from the user-selected position would trigger an alarm.

The present disclosure describes using a sensor with a sensitive magnetic field detection device that incorporates a large dynamic range. This increased dynamic range allows for large separations between the sensor and the magnet. A set-point threshold for the magnetic field is user-adjustable by way of a "set" button or switch. Once the sensor is installed, the door or window can be positioned within 6 inches or less of the field magnet. The set point is sampled when the "set" button is pressed. If the magnetic field is changed by re-positioning the door or window, then the alarm is triggered. If an additional magnetic field is introduced to defeat the sensor, this change in magnetic field is sensed and the alarm is triggered. One advantage of using the presently described sensor is the ability to have a window or door open and still be alarm-protected. Another advantage is the ability to detect an attempt to defeat or override the sensor using an external magnetic field.

A typical security sensor most often uses a reed switch placed in very close proximity (usually less than 1") to a magnet to indicate only an open or closed state. With the presently described sensor, the magnet may be placed much further away, in different directions, and with a user-adjustable distance threshold.

For example, currently if a homeowner wants to sleep with his or her window cracked ajar, the homeowner needs to install two magnets (one for the open position, and one for the closed position) and very carefully open the window to a specific position. With the presently described sensor, the homeowner will be able to use a single magnet and be able to open the window as much or as little as he or she wants, while still being able to detect an intrusion.

Another advantage of this sensor would be ease of installation. The magnet and gap options are increased dramatically, providing much more leeway in the type of magnet and position of the magnet relative to the sensor.

In various embodiments, an adjustable security sensor device comprises a magnetic field sensor, a user input element, and a processor. The magnetic field sensor measures and samples magnetic fields from a magnet external to the device. The magnetic field sensor generates a first range of magnetic fields measurements sampled based on a first position of the magnet relative to the magnetic field sensor. The user input element identifies a second range of magnetic fields measurements based on a second position of the magnet relative to the magnetic field sensor. The second position includes a user-defined position of the magnet relative to the magnetic field sensor. The device generates a sampling of magnetic fields measurements using the magnetic field sensor, compares the sampling of magnetic fields measurements with the first range of magnetic fields measurements and the second range of magnetic fields measurements, and identifies a position of the device relative to the magnet based on the comparison.

In another example embodiment, the sensor device includes a magnetometer that has a large dynamic range in field strength as well as field (flux) direction. Instead of traditionally placing the magnet almost exactly parallel or perpendicular to a reed switch, it may be possible to use the magnetic field of the earth as the "magnet" for the sensor on a swinging door or window.

Figure 1A:
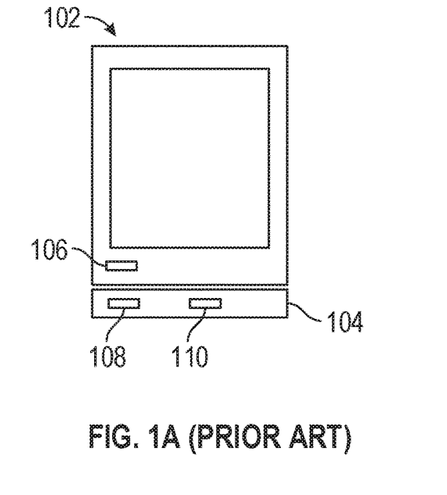
FIG. 1A is a diagram illustrating conventional window sensors attached to a window in a closed position.

FIG. 1A is a diagram illustrating conventional window sensors attached to a window in a closed position. A window 102 slides along a frame 104 such as a rail. The window 102 is illustrated in a closed position in FIG. 1A. A reed sensor 106 is mounted to the window 102. A first magnet 108 is mounted adjacent (e.g., parallel to the reed switch within a few millimeters) to the reed sensor 106 when the window 102 is in the closed position. Therefore, the window 102 is determined to be open when the reed sensor 106 is no longer triggered by the first magnet 108. However, for a homeowner wishing to secure his or her home with his or her window partially opened, a second magnet 110 is mounted to the frame 104 at a user-defined location.

Figure 1B:
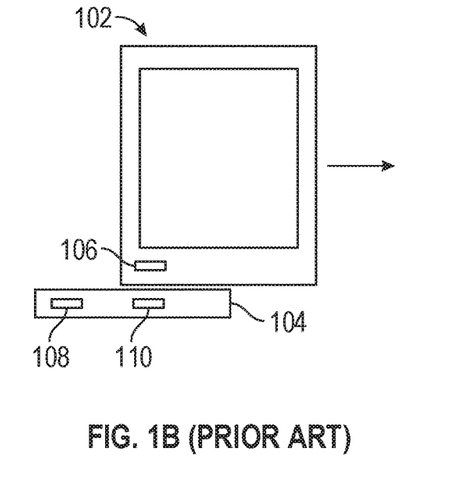
FIG. 1B is a diagram illustrating conventional window sensors attached to a window in an open position.

FIG. 1B is a diagram illustrating conventional window sensors attached to a window in an open position. When the window 102 moves to the user-defined location, the second magnet 110 triggers the reed sensor 106 to simulate that the window 102 is in a closed position when in reality it is partially open.

Figure 2A:
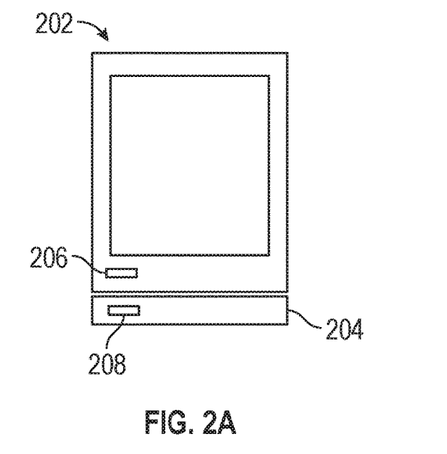
FIG. 2A is a diagram illustrating a user-adjustable window sensor attached to a window in a closed position.

FIG. 2A is a diagram illustrating a user-adjustable window sensor attached to a window in a closed position. A window 202 slides along a frame 204 such as a rail. The window 202 is illustrated in a closed position in FIG. 2A. A dynamic range sensor device 206 (also referred to as a sensor device and a user-adjustable window sensor) is mounted to the window 202. A magnet 208 is mounted adjacent to the user-adjustable window sensor 206 when the window 202 is in the closed position.

Figure 2B:
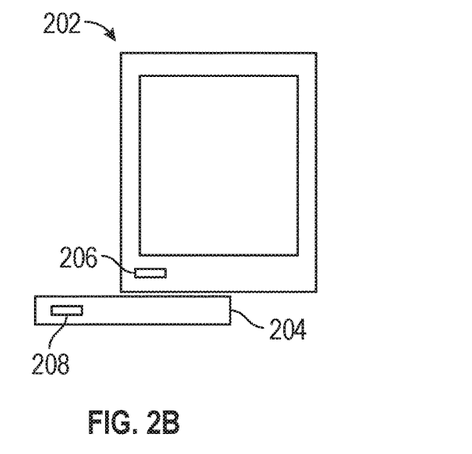
FIG. 2B is a diagram illustrating a user-adjustable window sensor attached to a window in an open position.

FIG. 2B is a diagram illustrating a user-adjustable window sensor attached to a window in an open position. When the window 202 moves to a user-defined location as illustrated in FIG. 2B, the dynamic range sensor device 206 samples the magnetic field from the magnet 208 and determines that the sampled magnetic field measurements correspond to a range associated with the user-defined location. The dynamic range sensor device 206 then determines that the window 202 is opened to a distance associated with the user-defined location.

Figure 3:
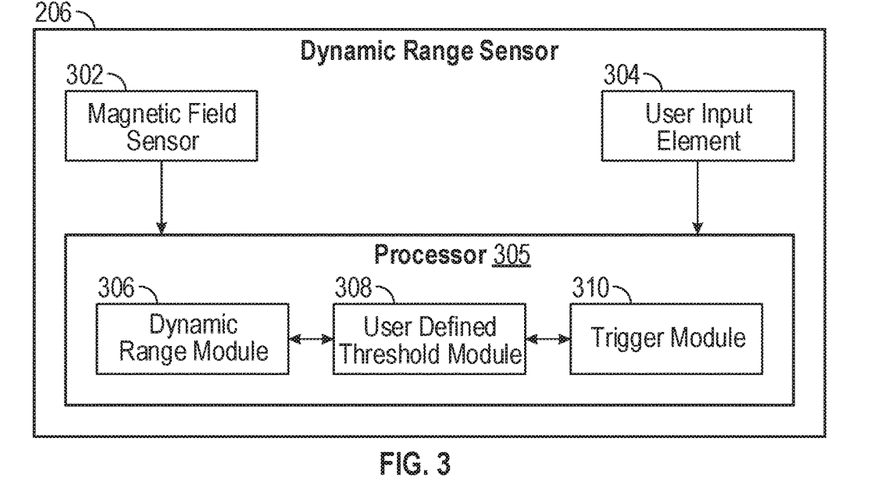
FIG. 3 is a block diagram illustrating an example embodiment of a dynamic range sensor device.

FIG. 3 is a block diagram illustrating an example embodiment of a dynamic range sensor device 206. The dynamic range sensor device 206 includes a magnetic field sensor 302, a user input element 304, and a processor 305.

The magnetic field sensor 302 is configured to measure and sample magnetic fields emanating from the magnet 208. For example, the magnetic field sensor 302 includes a MEMS-based magnetic field sensor that detects changes in the magnetic fields. Examples of MEMS-based magnetic field sensors include Lorentz-force-based MEMS sensors that detect the effects of the Lorentz force as a result of a magnetic field. In one example embodiment, the magnetic field sensor 302 generates a sample of magnetic fields measurements in response to a user input (e.g., a user pushing a button) generated by the user input element 304 (e.g., a button, or any other user interface). The user input element 304 may be used to identify one or more user-selected positions (e.g., distances) of the dynamic range sensor device 206 relative to the magnet 208.

The processor 305 includes a dynamic range module 306, a user-defined threshold module 308, and a trigger module 310. The dynamic range module 306 receives sensor data from the magnetic field sensor 302. In one example embodiment, the dynamic range module 306 samples the sensor data to generate a range of magnetic field measurements corresponding to a position of the dynamic range sensor device 206 relative to the magnet 208. For example, the user mounts the dynamic range sensor device 206 on the window 202 so that the dynamic range sensor device 206 is adjacent to the magnet 208. The user identifies the closed position by pressing on the user input element 304 (e.g., a button named "closed"). In response to detecting the user input element 304 corresponding to the closed position, the dynamic range module 306 directs the magnetic field sensor 302 to generate a sample of magnetic field measurements. For example, the sample may include a predefined number of measurements. The dynamic range module 306 then identifies or computes a first range based on the sampled magnetic field measurements. The dynamic range module 306 then associates the first range with the closed position. Therefore, the dynamic range module 306 is capable of determining whether the window 202 is closed or open by comparing a measured magnetic field with the first range. If the measured magnetic field is within the first range, the window 202 is deemed closed. If the measured magnetic field is outside the first range, the window 202 is deemed open.

The user-defined threshold module 308 enables a user to set or add additional positions (e.g., halfway open, one-third open, a quarter open) besides completely closed and or open (even if the window is partially opened). For example, after teaching or training the dynamic range sensor device 206 about the magnetic fields in the closed position, the user opens the window 202 to a desired location as previously illustrated in FIG. 2B. Once the window 202 is at the desired location, the user triggers the user input element 304 (e.g., the user presses a button named "position A"). In response to detecting the user triggering the user input element 304 (e.g., pressing the button named "position A"), the user-defined threshold module 308 directs the magnetic field sensor 302 to generate a sample of magnetic field measurements. The dynamic range module 306 then identifies or computes a second range based on the sampled magnetic field measurements. The user-defined threshold module 308 then associates the second range with the user-defined position. Therefore, the user-defined threshold module 308 is capable of determining whether the window 202 is located at the user-defined position by comparing a measured magnetic field with the second range. If the measured magnetic field is within the second range, the window 202 is deemed to be located or positioned at the user-defined position. If the measured magnetic field is outside the first and second ranges, the window 202 is deemed open and not located at the user-defined position. Those of ordinary skill in the art will recognize that additional user-defined positions may be added using a similar process to that previously described.

The trigger module 310 directs the magnetic field sensor 302 to sample magnetic measurements to detect any variation in the measured magnetic field outside the first or second ranges. For example, if the processor 305 determines that the sensor data from the magnetic field sensor 302 is within the first range and subsequently the measured magnetic field has changed to a level outside the first range (but is within the second range as well), the trigger module 310 generates a notification signal to an alarm system to indicate that either the window 202 has moved from the closed position or another magnet is being used to seek access to the window 202. Similarly, if the processor 305 determines that the sensor data from the magnetic field sensor 302 is within the second range and subsequently the measured magnetic field has changed to a level outside the second range, the trigger module 310 generates a notification signal to the alarm system to indicate that either the window 202 has moved away from the user-defined position or another magnet is being used to seek access to the window 202.

The dynamic range sensor device 206 includes a wired or wireless communication component (not shown) configured to communicate with another device such as a control panel of a home security system or a remote server (e.g., via the Internet). In one example embodiment, the communication component transmits the position or state (e.g., open, closed, position A, position B) to the home security system or the remote server.

Figure 4A:
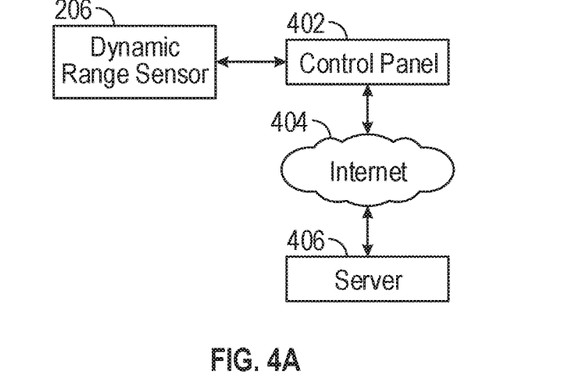
FIG. 4A is a block diagram illustrating an example embodiment of a network system for implementing the dynamic range sensor device of FIG. 3.

FIG. 4A is a block diagram illustrating an example embodiment of a network system for implementing the dynamic range sensor device 206. The dynamic range sensor device 206 communicates with a control panel 402 of a home security system via wireless means (e.g., radio frequency (RF), Wi-Fi, Bluetooth). The control panel 402 communicates with a remote server 406 via a communication network 404 (e.g., the Internet). The remote server 406 receives the position of the window 202 and can perform different functions based on the position of the window 202. For example, the remote server 406 can alert or notify the homeowner that the window 202 has been left open at position A for more than x hours. The control panel 402 may still be capable of arming the security system even when the window 202 is open, for example, when the window 202 is cracked open to position A. Any movement of the window 202 from position A would trigger an alarm.

Figure 4B:
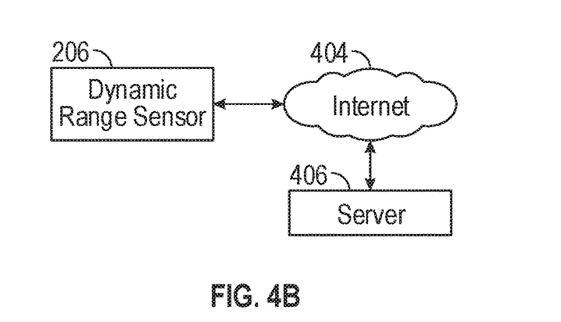
FIG. 4B is a block diagram illustrating another example embodiment of a network system for implementing the dynamic range sensor device of FIG. 3.

FIG. 4B is a block diagram illustrating another example embodiment of a network system for implementing the dynamic range sensor device 206. The dynamic range sensor device 206 communicates with the remote server 406 via the communication network 404 (e.g., the Internet).

Figure 5:
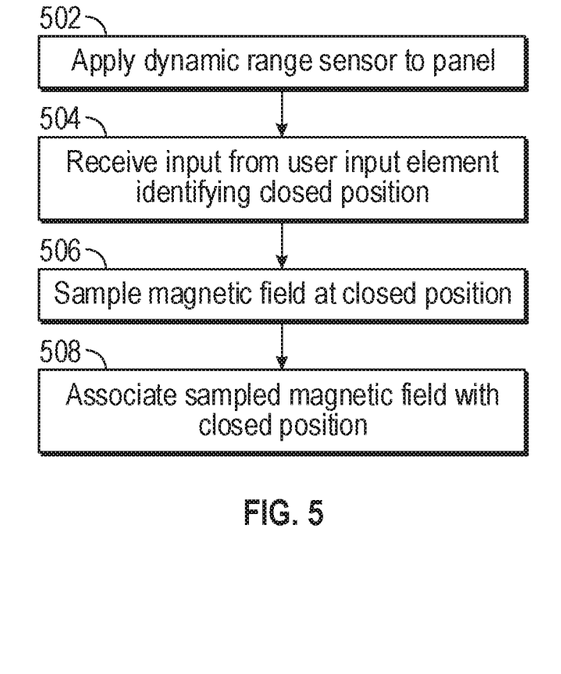
FIG. 5 is a flow diagram illustrating an example embodiment of a method for sampling magnetic fields in a closed position of a window.

FIG. 5 is a flow diagram illustrating an example embodiment of a method for sampling magnetic fields in a closed position of a window. At operation 502, the dynamic range sensor device 206 is mounted or applied to a panel or portion of a window. At operation 504, the dynamic range sensor device 206 receives an input from the user input element 304 to identify that the dynamic range sensor device 206 is located at a location associated with the window being closed. At operation 506, the dynamic range sensor device 206 generates a sample of magnetic field measurements at the closed position. At operation 508, the dynamic range sensor device 206 associates the sample of magnetic field measurements with the closed position. In another example embodiment, the dynamic range sensor device 206 generates a first range (e.g., a threshold range) based on the sample of magnetic field measurements and associates the first range with the closed position of the window.

Figure 6:
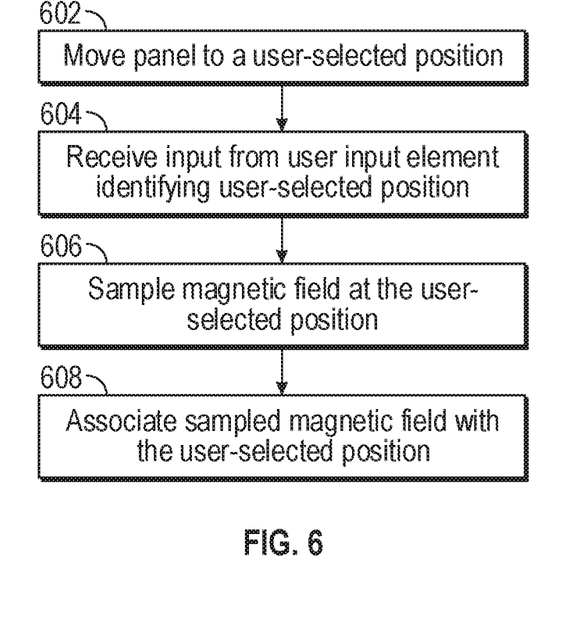
FIG. 6 is a flow diagram illustrating an example embodiment of a method for sampling magnetic fields in a user-selected position of a window.

FIG. 6 is a flow diagram illustrating an example embodiment of a method for sampling magnetic fields in a user-selected position of a window. At operation 602, a homeowner moves the window to a user-selected position (e.g., cracked open 5 inches). At operation 604, the dynamic range sensor device 206 receives an input from the user input element 304 identifying the user-selected position. For example, the user presses a button named "position A" from the user input element 304. At operation 606, the dynamic range sensor device 206 generates a sample of magnetic field measurements at the user-selected position. At operation 608, the dynamic range sensor device 206 associates the sampled magnetic field measurements with the user-selected position. In another example embodiment, the dynamic range sensor device 206 generates a second range (e.g., a threshold range) based on the sample of magnetic field measurements and associates the second range with the user-selected position of the window.

Figure 7:
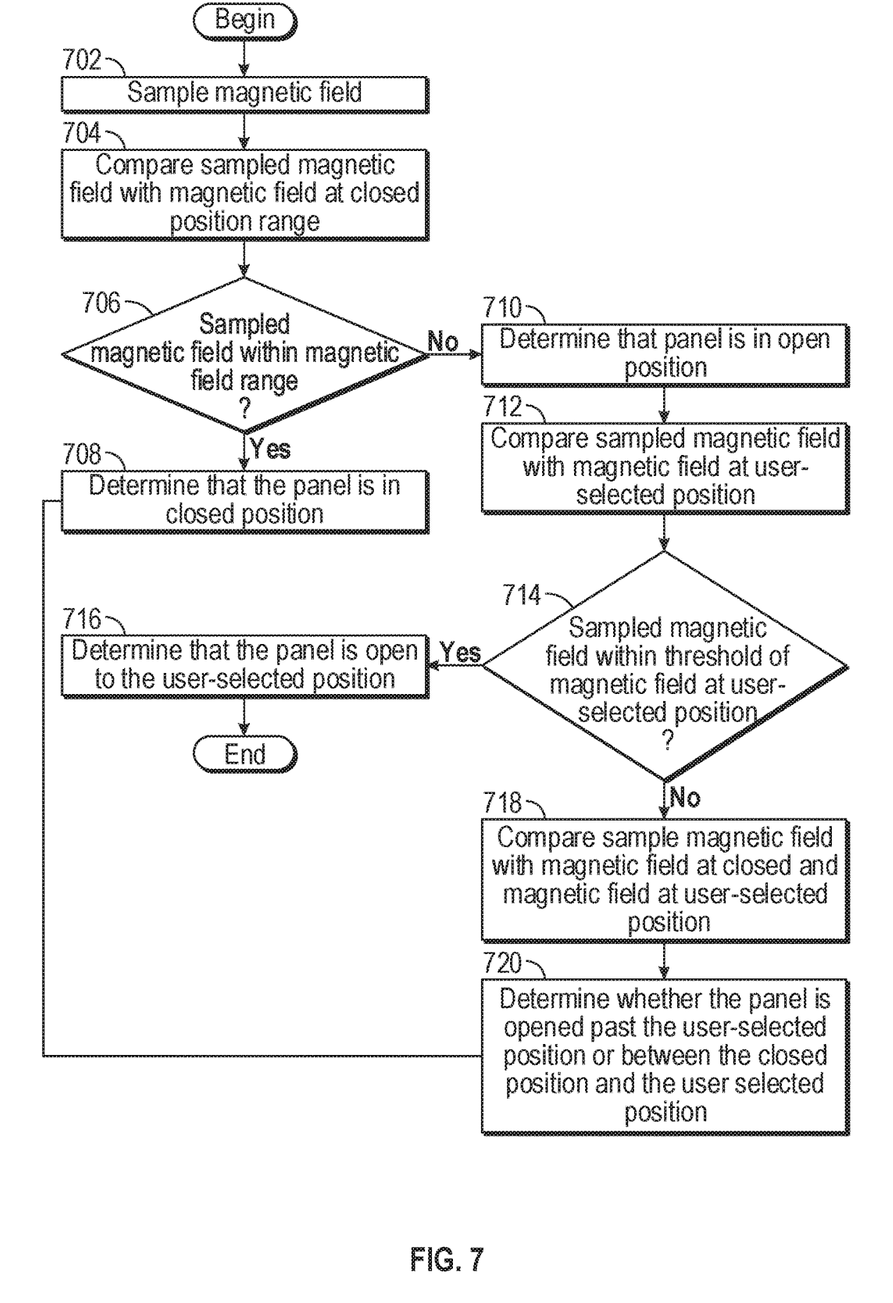
FIG. 7 is a flow diagram illustrating an example embodiment of a method for determining a position of a window using the dynamic range sensor device of FIG. 3.

FIG. 7 is a flow diagram illustrating an example embodiment of a method for determining a position of a window using the dynamic range sensor device 206. At operation 702, the dynamic range sensor device 206 samples magnetic fields measurements using the magnetic field sensor 302. At operation 704, the dynamic range sensor device 206 compares the sampled magnetic field measurements with the first range (associated with the closed position). At operation 706, the dynamic range sensor device 206 determines whether the sampled magnetic field measurements are within the first range. If the sampled magnetic field measurements are within the first range, then at operation 708 the dynamic range sensor device 206 determines that the panel (or window) is in a closed position. If the sampled magnetic field measurements are outside the first range, the dynamic range sensor device 206 determines that the window is in an open position at operation 710 and further compares the sampled magnetic field measurements to the second range (associated with the user-selected position) at operation 712. At operation 714, the dynamic range sensor device 206 determines whether the sampled magnetic field measurements are within the second range (or threshold). If the sampled magnetic field measurements are within the second range, the dynamic range sensor device 206 determines that the window is open and located at the user-selected position at operation 716. If the sampled magnetic field measurements are outside the second range, the dynamic range sensor device 206 compares the sampled magnetic field measurements with both the first and second ranges at operation 718. At operation 720, the dynamic range sensor device 206 determines whether the window is open past the user-selected position or is located between the closed position and the user-selected position based on the comparison.

Figure 8:
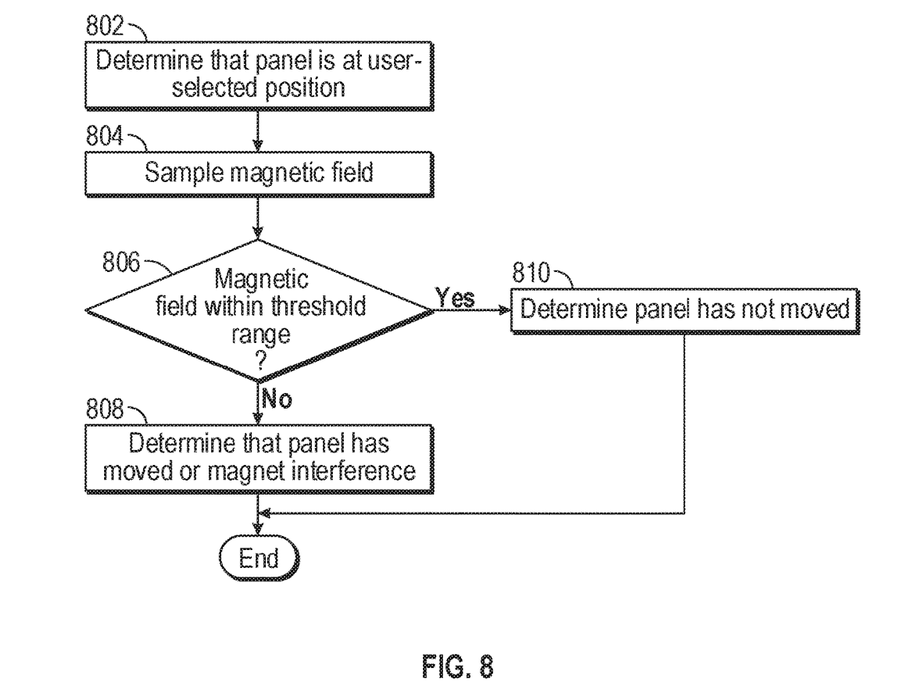
FIG. 8 is a flow diagram illustrating an example embodiment of a method for determining a security breach at a window using the dynamic range sensor device of FIG. 3.

FIG. 8 is a flow diagram illustrating an example embodiment of a method for determining a security breach at a window using the dynamic range sensor device 206. At operation 802, the dynamic range sensor device 206 determines that the window/panel is located at the user-selected position using the method previously described with respect to FIG. 7. At operation 804, the dynamic range sensor device 206 samples magnetic fields measurements using the magnetic field sensor 302. At operation 806, the dynamic range sensor device 206 determines whether the sampled magnetic fields measurements are within a threshold sensitivity range (e.g., an adjustable threshold sensitivity range). If the sampled magnetic fields measurements are not within the threshold sensitivity range, then at operation 808 the dynamic range sensor device 206 determines that the window has moved or a foreign magnet has caused an interference. If the sampled magnetic fields measurements are within the threshold sensitivity range, then at operation 810 the dynamic range sensor device 206 determines that the window has not moved from its current user-selected position.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the communication network 404 and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network 404.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

A computing system can include clients and servers. A client and server are generally remote from each other and typically interact through a communication network 404. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture

Figure 9:
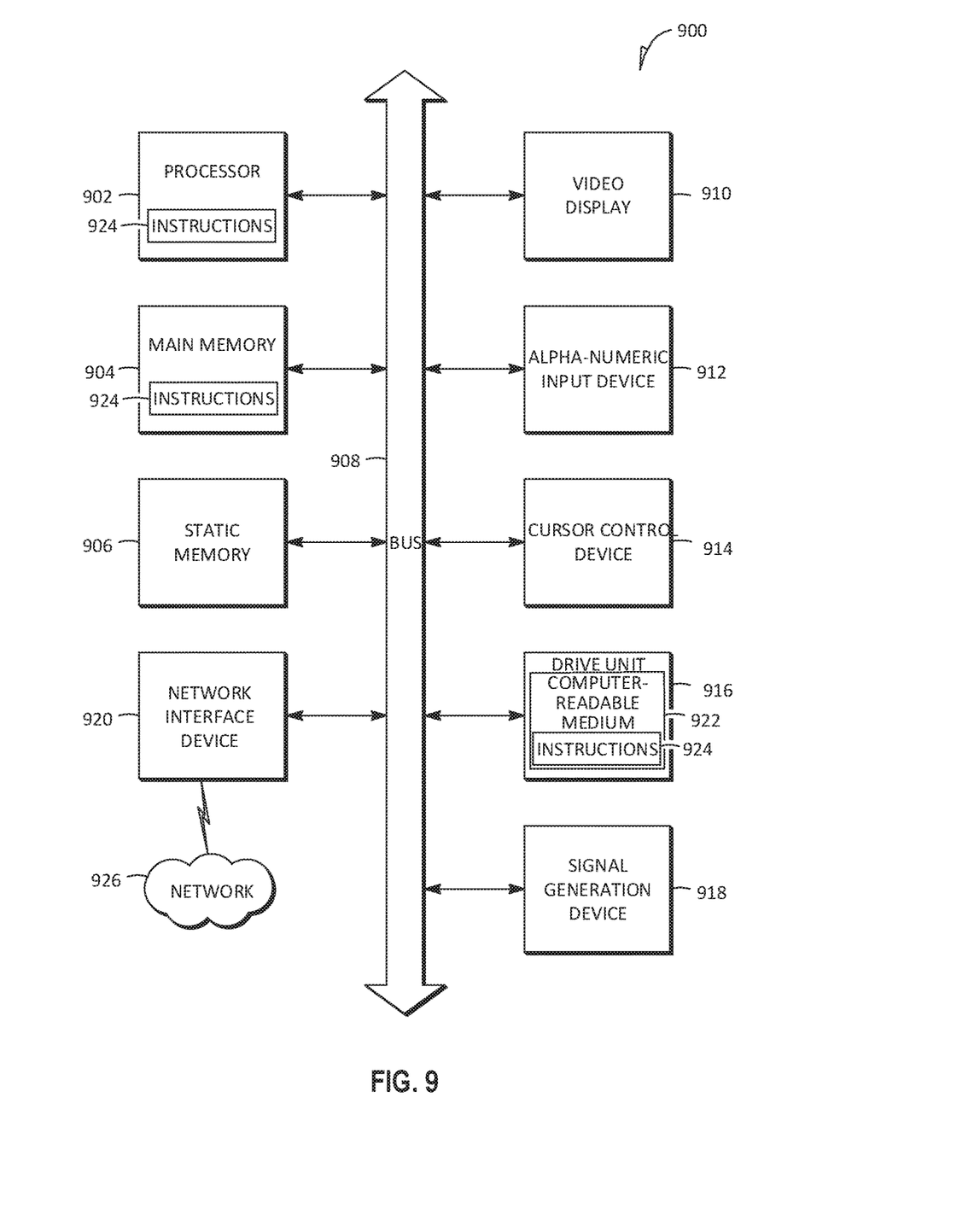
FIG. 9 shows a diagrammatic representation of a machine in the example form of a computer system within which a set of instructions may be executed to cause the machine to perform any one or more of the methodologies discussed herein.

FIG. 9 is a block diagram of a machine in the example form of a computer system 900 within which instructions 924 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing the instructions 924 (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a computer (or machine)-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting computer-readable media 922. The instructions 924 may also reside, completely or at least partially, within the static memory 906.

While the computer-readable medium 922 is shown, in an example embodiment, to be a single medium, the term "machine-readable medium" may include a single medium or multiple media (e.g., a centralized or distributed database, and/or associated caches and servers) that store the one or more instructions 924 or data structures. The term "computer-readable medium" shall also be taken to include any tangible medium that is capable of storing, encoding, or carrying the instructions 924 for execution by the machine and that cause the machine to perform any one or more of the methodologies of the present embodiments, or that is capable of storing, encoding, or carrying data structures utilized by or associated with such instructions 924. The term "computer-readable medium" shall accordingly be taken to include, but not be limited to, solid-state memories, and optical and magnetic media. Specific examples of computer-readable media 922 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 924 may further be transmitted or received over a communication network 926 using a transmission medium. The instructions 924 may be transmitted using the network interface device 920 and any one of a number of well-known transfer protocols (e.g., hypertext transfer protocol (HTTP)). Examples of communication networks 926 include a local-area network (LAN), a wide-area network (WAN), the Internet, mobile telephone networks, plain old telephone service (POTS) networks, and wireless data networks (e.g., Wi-Fi and WiMAX networks). The term "transmission medium" shall be taken to include any intangible medium capable of storing, encoding, or carrying the instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The following enumerated embodiments describe various example embodiments of an adjustable entry security sensor device discussed herein.

A first embodiment provides a device comprising:
a magnetic field sensor configured to measure and sample magnetic fields from a magnet external to the device, the magnetic field sensor configured to generate a first range of magnetic fields measurements sampled based on a first position of the magnet relative to the magnetic field sensor;
a user input element configured to identify a second range of magnetic fields measurements based on a second position of the magnet relative to the magnetic field sensor, the second position including a user-defined position of the magnet relative to the magnetic field sensor; and
a processor configured to perform operations comprising:
generating a sampling of magnetic fields measurements using the magnetic field sensor;
comparing the sampling of magnetic fields measurements with the first range of magnetic fields measurements and the second range of magnetic fields measurements; and
identifying a position of the device relative to the magnet based on the comparison.

A second embodiment provides a device according to the first embodiment, wherein the device is configured to be mounted to a portion of a window, and the magnet is configured to be mounted to a portion of a frame of the window, the device being adjacent to the magnet in the first position of the magnet relative to the magnetic field sensor.

A third embodiment provides a device according to the second embodiment, wherein the device is not adjacent to the magnet in the second position of the magnet relative to the magnetic field sensor, wherein the user-defined position includes a user-selected distance between the magnetic field sensor and the magnet.

A fourth embodiment provides a device according to the first embodiment, wherein the operations further comprise:
generating a first sampling of magnetic fields measurements in response to the magnet being at the first position;
generating the first range of magnetic fields measurements corresponding to the first sampling of magnetic fields measurements, a maximum measurement of the first sampling corresponding to a maximum value of the first range, a minimum measurement of the first sampling corresponding to a minimum value of the first range; and
associating the first range of magnetic fields measurements with a closed position.

A fifth embodiment provides a device according to the fourth embodiment, wherein the operations further comprise:
receiving a user input to cause the magnetic field sensor to generate a second sampling of magnetic fields measurements in response to the magnet being at the second position;
generating the second range of magnetic fields measurements corresponding to the second sampling of magnetic fields measurements, a maximum measurement of the second sampling corresponding to a maximum value of the second range, a minimum measurement of the second sampling corresponding to a minimum value of the second range; and
associating the second range of magnetic fields measurements with the user-defined position of the magnet relative to the magnetic field sensor.

A sixth embodiment provides a device according to the first embodiment, wherein the operations further comprise:
determining that the sampling of magnetic fields measurements is within the first range of magnetic fields measurements; and
identifying that the magnet is at the first position relative to the magnetic field sensor in response to determining that the sampling of magnetic fields measurements is within the first range of magnetic fields measurements.

A seventh embodiment provides a device according to the first embodiment, wherein the operations further comprise:
determining that the sampling of magnetic fields measurements is within the second range of magnetic fields measurements; and
identifying that the magnet is at the user-defined position relative to the magnetic field sensor in response to determining that the sampling of magnetic fields measurements is within the second range of magnetic fields measurements.

An eighth embodiment provides a device according to the first embodiment, wherein the operations further comprise:
determining that the sampling of magnetic fields measurements is outside the first range of magnetic fields measurements and outside the second range of magnetic fields measurements;
determining that the sampling of magnetic fields measurements is less than the first range of magnetic fields measurements and greater than the second range of magnetic fields measurements in response to determining that the sampling of magnetic fields measurements is outside the first range of magnetic fields measurements and outside the second range of magnetic fields measurements; and
identifying that the magnet is located between the first position and the user-defined position in response to determining that the sampling of magnetic fields measurements is less than the first range of magnetic fields measurements and greater than the second range of magnetic fields measurements.

A ninth embodiment provides a device according to the first embodiment, wherein the operations further comprise:
determining that the sampling of magnetic fields measurements is outside the first range of magnetic fields measurements and outside the second range of magnetic fields measurements;
determining that the sampling of magnetic fields measurements is less than the first range of magnetic fields measurements and less than the second range of magnetic fields measurements in response to determining that the sampling of magnetic fields measurements is outside the first range of magnetic fields measurements and outside the second range of magnetic fields measurements; and
identifying that the magnet is located further past the user-defined position in response to determining that the sampling of magnetic fields measurements is less than the first range of magnetic fields measurements and less than the second range of magnetic fields measurements.

A tenth embodiment provides a device according to the first embodiment, further comprising:
a communication module configured to communicate the position of the device relative to the magnet to a security system, the security system configured to trigger an alarm in response to the sampling of magnetic fields measurements being outside both the first and the second range of magnetic fields measurements.

What is claimed is:

1. A device comprising:
a magnetic field sensor configured to measure and sample magnetic fields from a magnet external to the device, the magnetic field sensor configured to generate a first range of magnetic fields measurements sampled based on a first position of the magnet relative to the magnetic field sensor;
a user input element configured to identify a second range of magnetic fields measurements based on a second position of the magnet relative to the magnetic field sensor, the second position including a user-defined position of the magnet relative to the magnetic field sensor; and
a processor configured to perform operations comprising:
generating a sampling of magnetic fields measurements using the magnetic field sensor;
comparing the sampling of magnetic fields measurements with the first range of magnetic fields measurements and the second range of magnetic fields measurements; and
identifying a position of the device relative to the magnet based on the comparison.

2. The device of claim 1, wherein the device is configured to be mounted to a portion of a window, and the magnet is configured to be mounted to a portion of a frame of the window, the device being adjacent to the magnet in the first position of the magnet relative to the magnetic field sensor.

3. The device of claim 2, wherein the device is not adjacent to the magnet in the second position of the magnet relative to the magnetic field sensor, wherein the user-defined position includes a user-selected distance between the magnetic field sensor and the magnet.

4. The device of claim 1, wherein the operations further comprise:
generating a first sampling of magnetic fields measurements in response to the magnet being at the first position;
generating the first range of magnetic fields measurements corresponding to the first sampling of magnetic fields measurements, a maximum measurement of the first sampling corresponding to a maximum value of the first range, a minimum measurement of the first sampling corresponding to a minimum value of the first range; and
associating the first range of magnetic fields measurements with a closed position of the device.

5. The device of claim 4, wherein the operations further comprise:
receiving a user input to cause the magnetic field sensor to generate a second sampling of magnetic fields measurements in response to the magnet being at the second position;
generating the second range of magnetic fields measurements corresponding to the second sampling of magnetic fields measurements, a maximum measurement of the second sampling corresponding to a maximum value of the second range, a minimum measurement of the second sampling corresponding to a minimum value of the second range; and
associating the second range of magnetic fields measurements with the user-defined position of the magnet relative to the magnetic field sensor.

6. The device of claim 1, wherein the operations further comprise:
determining that the sampling of magnetic fields measurements is within the first range of magnetic fields measurements; and
identifying that the magnet is at the first position relative to the magnetic field sensor in response to determining that the sampling of magnetic fields measurements is within the first range of magnetic fields measurements.

7. The device of claim 1, wherein the operations further comprise:
determining that the sampling of magnetic fields measurements is within the second range of magnetic fields measurements; and
identifying that the magnet is at the user-defined position relative to the magnetic field sensor in response to determining that the sampling of magnetic fields measurements is within the second range of magnetic fields measurements.

8. The device of claim 1, wherein the operations further comprise:
determining that the sampling of magnetic fields measurements is outside the first range of magnetic fields measurements and outside the second range of magnetic fields measurements;
determining that the sampling of magnetic fields measurements is less than the first range of magnetic fields measurements and greater than the second range of magnetic fields measurements in response to determining that the sampling of magnetic fields measurements is outside the first range of magnetic fields measurements and outside the second range of magnetic fields measurements; and
identifying that the magnet is located between the first position and the user-defined position in response to determining that the sampling of magnetic fields measurements is less than the first range of magnetic fields measurements and greater than the second range of magnetic fields measurements.

9. The device of claim 1, wherein the operations further comprise:
determining that the sampling of magnetic fields measurements is outside the first range of magnetic fields measurements and outside the second range of magnetic fields measurements;
determining that the sampling of magnetic fields measurements is less than the first range of magnetic fields measurements and less than the second range of magnetic fields measurements in response to determining that the sampling of magnetic fields measurements is outside the first range of magnetic fields measurements and outside the second range of magnetic fields measurements; and
identifying that the magnet is located further than the user-defined position in response to determining that the sampling of magnetic fields measurements is less than the first range of magnetic fields measurements and less than the second range of magnetic fields measurements.

10. The device of claim 1, further comprising:
a communication module configured to communicate the position of the device relative to the magnet to a security system, the security system configured to trigger an alarm in response to the sampling of magnetic fields measurements being outside both the first and the second range of magnetic fields measurements.

11. A method comprising:
  measuring and sampling magnetic fields from a magnet external to a device using a magnetic field sensor in the device;
  generating a first range of magnetic fields measurements sampled based on a first position of the magnet relative to the magnetic field sensor;
  identifying a second range of magnetic fields measurements based on a second position of the magnet relative to the magnetic field sensor in response to a user input, the second position including a user-defined position of the magnet relative to the magnetic field sensor;
  generating a sampling of magnetic fields measurements using the magnetic field sensor;
  comparing the sampling of magnetic fields measurements with the first range of magnetic fields measurements and the second range of magnetic fields measurements; and
  identifying a position of the device relative to the magnet based on the comparison.

12. The method of claim 11, wherein the device is configured to be mounted to a portion of a window, and the magnet is configured to be mounted to a portion of a frame of the window, the device being adjacent to the magnet in the first position of the magnet relative to the magnetic field sensor.

13. The method of claim 12, wherein the device is not adjacent to the magnet in the second position of the magnet relative to the magnetic field sensor, wherein the user-defined position includes a user-selected distance between the magnetic field sensor and the magnet.

14. The method of claim 11, further comprising:
  generating a first sampling of magnetic fields measurements in response to the magnet being at the first position;
  generating the first range of magnetic fields measurements corresponding to the first sampling of magnetic fields measurements, a maximum measurement of the first sampling corresponding to a maximum value of the first range, a minimum measurement of the first sampling corresponding to a minimum value of the first range; and
  associating the first range of magnetic fields measurements with a closed position of the device.

15. The method of claim 11, further comprising:
  receiving another user input to cause the magnetic field sensor to generate a second sampling of magnetic fields measurements in response to the magnet being at the second position;
  generating the second range of magnetic fields measurements corresponding to the second sampling of magnetic fields measurements, a maximum measurement of the second sampling corresponding to a maximum value of the second range, a minimum measurement of the second sampling corresponding to a minimum value of the second range; and
  associating the second range of magnetic fields measurements with the user-defined position of the magnet relative to the magnetic field sensor.

16. The method of claim 11, further comprising:
  determining that the sampling of magnetic fields measurements is within the first range of magnetic fields measurements; and
  identifying that the magnet is at the first position relative to the magnetic field sensor in response to determining that the sampling of magnetic fields measurements is within the first range of magnetic fields measurements.

17. The method of claim 11, further comprising:
  determining that the sampling of magnetic fields measurements is within the second range of magnetic fields measurements; and
  identifying that the magnet is at the user-defined position relative to the magnetic field sensor in response to determining that the sampling of magnetic fields measurements is within the second range of magnetic fields measurements.

18. The method of claim 11, further comprising:
  determining that the sampling of magnetic fields measurements is outside the first range of magnetic fields measurements and outside the second range of magnetic fields measurements;
  determining that the sampling of magnetic fields measurements is less than the first range of magnetic fields measurements and greater than the second range of magnetic fields measurements in response to determining that the sampling of magnetic fields measurements is outside the first range of magnetic fields measurements and outside the second range of magnetic fields measurements; and
  identifying that the magnet is located between the first position and the user-defined position in response to determining that the sampling of magnetic fields measurements is less than the first range of magnetic fields measurements and greater than the second range of magnetic fields measurements.

19. The method of claim 11, further comprising:
  determining that the sampling of magnetic fields measurements is outside the first range of magnetic fields measurements and outside the second range of magnetic fields measurements;
  determining that the sampling of magnetic fields measurements is less than the first range of magnetic fields measurements and less than the second range of magnetic fields measurements in response to determining that the sampling of magnetic fields measurements is outside the first range of magnetic fields measurements and outside the second range of magnetic fields measurements; and
  identifying that the magnet is located further than the user-defined position in response to determining that the sampling of magnetic fields measurements is less than the first range of magnetic fields measurements and less than the second range of magnetic fields measurements.

20. A non-transitory computer-readable storage medium storing a set of instructions that, when executed by a processor, cause the processor to perform operations comprising:
  measuring and sampling magnetic fields from a magnet external to a device using a magnetic field sensor in the device;
  generating a first range of magnetic fields measurements sampled based on a first position of the magnet relative to the magnetic field sensor;
  identifying a second range of magnetic fields measurements based on a second position of the magnet relative to the magnetic field sensor in response to a user input, the second position including a user-defined position of the magnet relative to the magnetic field sensor;
  generating a sampling of magnetic fields measurements using the magnetic field sensor;

comparing the sampling of magnetic fields measurements with the first range of magnetic fields measurements and the second range of magnetic fields measurements; and identifying a position of the device relative to the magnet based on the comparison.

* * * * *